Aug. 23, 1955  B. BARÉNYI  2,716,032
STEERING MECHANISM FOR AUTOMOTIVE VEHICLES
WITH SEPARATELY CONSTRUCTED BODY SECTIONS
Filed July 6, 1951

Inventor
Béla Barényi
By
Dicke and Padlon
attorneys ns # United States Patent Office 2,716,032
Patented Aug. 23, 1955

2,716,032

STEERING MECHANISM FOR AUTOMOTIVE VEHICLES WITH SEPARATELY CONSTRUCTED BODY SECTIONS

Béla Barényi, Stuttgart-Rohr, Germany

Application July 6, 1951, Serial No. 235,487

3 Claims. (Cl. 280—87)

The present invention relates to steering mechanism for automotive vehicles having a plurality of separately constructed body sections or cells.

One object of the present invention is to facilitate the assembly of a steering mechanism, the component portions of which are located in several of the separately constructed vehicle or body sections and to assemble such component portions in such a way that relative motions between the respective individual vehicle cells or body sections does not adversely influence the operation of the steering mechanism.

It is a further object of the present invention to dispose the steering wheel and the steering gear housing at a place within their respective individual vehicle or body section, which is most favorable for the best utilization of the available space within those sections, and if necessary for attaining this end, to dispose the steering wheel in any desired offset position relative to the steering gear housing so that the steering gear housing can, for instance, be located in the upper portion of the front section and substantially in the horizontal center plane of this section.

The adjustment and the assembly of the steering mechanism is to be effected independently of the fitting and assembly of the vehicle cells or of the parts supporting the steering mechanism in such a manner that relative motions between the cells or the vehicle parts do not affect adversely the driving parts of the steering mechanism.

Another object of the present invention is to transmit steering torque from the steering wheel to the gear housing by means including at least one but preferably two universal joints, thus making it possible to change or adjust the position of the steering wheel and/or the steering gear housing independently of each other in their respective sections.

Figure 1:
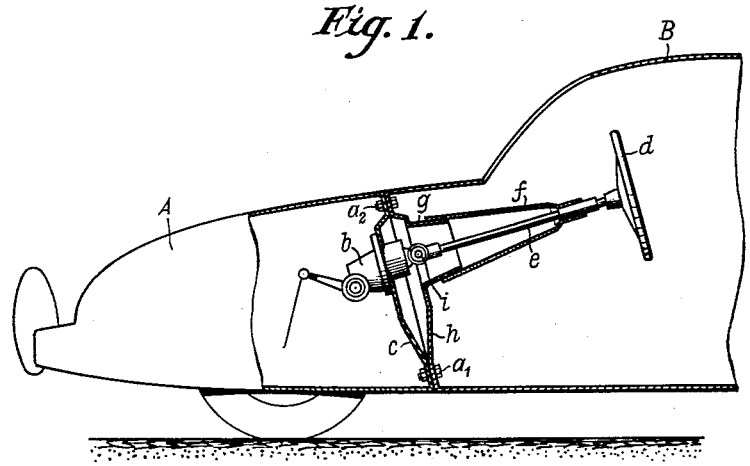
Figure 2:
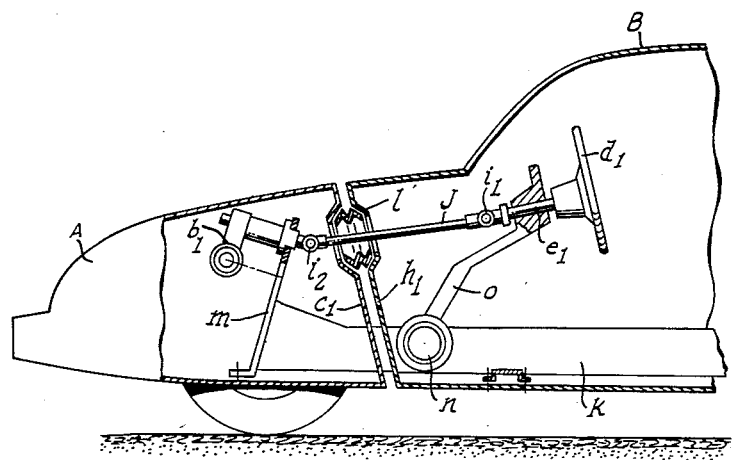

Other objects of the invention relate to various features of construction and arrangement of parts, which will be apparent from a consideration of the following specification and accompanying drawings showing two embodiments of the invention. In the drawings; Fig. 1 is a side view of the front part of a passenger car composed of separate sections of monocoque construction and shows the arrangement of the steering mechanism within the front and center section. Fig. 2 is a similar view as Fig. 1 showing the arrangement of the steering mechanism in a passenger car composed of separate body sections mounted on the vehicle frame.

In Fig. 1 the reference letter A designates the front vehicle section containing the front axle and the letter B refers to the center section containing the passenger seating facilities. Both sections are flanged to one another as indicated at $a_1$ and $a_2$. The steering gear housing $b$ which actuates the steering linkage of the front axle in any suitable manner is fastened to the rear wall of section A, whereas the steering wheel $d$ and the steering shaft $e$ are supported by a support member $f$, which can be of conical shape, the wide end of the supporting member $f$ being supported on and fastened to a frusto conical flange $g$ of the front wall of the vehicle section B. The steering shaft $e$ and the steering gear housing $b$ are connected by means of the universal joint $i$, which can be of any desired construction.

In the embodiment shown in Fig. 2 the body sections A and B are supported by the frame $k$, which can, for instance, be of tubular structure, and are also connected to each other by an annular coupling member 1 disposed between the walls $c_1$ and $h_1$. The steering housing $b_1$ is fastened to a frame member $m$ and the steering wheel shaft $e_1$ with the steering wheel $d_1$ is fastened to an adjustable supporting member $o$ pivotally attached to the vehicle frame at $n$. The supporting member $o$ can also carry other means required for manipulating the car on the road such as pedals and gear shifting means. The instrument board could also be attached to this supporting member $o$. The steering wheel shaft and the steering gear housing are operatively connected by a drive shaft $j$ and two universal joints $i_1$ and $i_2$ preferably of the flexible disc type, the drive shaft $j$ passing through the aperture of the annular coupling member 1.

It will be noted that the steering gear housing $b$ is disposed at a substantial distance above the front wheel axle as shown, that the steering gear means has an axis, and that the axis of said steering wheel is displaced with respect to the axis of said steering gear.

What I claim is:

1. In an automotive vehicle in combination: a plurality of individually constructed body cells, a vehicle frame supporting said cells, a steering wheel within one of said cells, support means for said steering wheel pivotally connected to said frame for pivotally supporting said steering wheel on said frame, a steering gear means within another of said cells, means for supporting said steering gear means on said frame, and means including two universal joints connecting said steering wheel with said steering gear means for transmitting the steering torque from said steering wheel to said steering gear means.

2. The combination according to claim 1 wherein said universal joints are of the flexible type.

3. The combination according to claim 1 wherein said steering gear means is provided with an axis, and wherein the axis of said steering wheel is displaced with respect to the axis of said steering gear means.

References Cited in the file of this patent

UNITED STATES PATENTS

| | | |
|---|---|---|
| 798,052 | Alden | Aug. 22, 1905 |
| 1,475,138 | Parenti | Nov. 20, 1923 |
| 1,478,389 | Harrington | Dec. 25, 1923 |
| 1,707,747 | Whitten | Apr. 2, 1929 |
| 2,209,094 | Ronning | July 23, 1940 |
| 2,549,925 | Paton | Apr. 24, 1951 |

FOREIGN PATENTS

| | | |
|---|---|---|
| 491,383 | Great Britain | Sept. 1, 1938 |